United States Patent
Negele et al.

(10) Patent No.: US 6,746,778 B1
(45) Date of Patent: Jun. 8, 2004

(54) METAL SUBSTRATE FOR A VEHICLE BODY

(75) Inventors: Ut Negele, Korb (DE); Chris Becher, Bad Urach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/058,810

(22) Filed: Apr. 13, 1998

(30) Foreign Application Priority Data

Apr. 11, 1997 (DE) .......................... 197 15 062

(51) Int. Cl.$^7$ .................. B32B 15/08; B32B 15/18; B32B 15/20; B05D 3/02
(52) U.S. Cl. .............. 428/458; 428/460; 428/461; 428/474.4; 428/457; 428/473.5; 427/372.2; 427/384; 427/385.5; 427/386; 427/388.1; 427/388.2; 427/388.4; 427/388.5; 427/407.1; 427/409; 427/410
(58) Field of Search .............. 428/474.4, 457, 428/458, 461; 427/372.2, 384, 385.5, 386, 388.1, 388.2, 388.4, 388.5, 407.1, 409, 410

(56) References Cited

U.S. PATENT DOCUMENTS

| | | | | |
|---|---|---|---|---|
| 4,118,377 A | * | 10/1978 | D'Alelio | ..................... 526/236 |
| 4,496,695 A | * | 1/1985 | Sugio et al. | ................. 525/391 |
| 4,548,986 A | * | 10/1985 | Suzuki et al. | .................. 525/66 |
| 4,616,071 A | | 10/1986 | Holubka | |
| 4,904,360 A | | 2/1990 | Wilson, Jr. et al. | |
| 5,034,279 A | * | 7/1991 | Wilson, Jr. et al. | .......... 428/457 |
| 5,084,304 A | * | 1/1992 | Lienert et al. | ............ 427/388.2 |
| 5,260,357 A | * | 11/1993 | Sachdeva | ..................... 523/414 |
| 5,378,740 A | * | 1/1995 | Ng | ............................... 523/414 |

FOREIGN PATENT DOCUMENTS

| | | |
|---|---|---|
| DE | 195 24 198 C1 | 3/1997 |
| EP | 0 317 795 | 5/1989 |
| EP | 0 357 110 | 3/1990 |
| EP | 0425265 B1 | 5/1991 |
| EP | 0 752 453 A2 | 1/1997 |

* cited by examiner

*Primary Examiner*—Vivian Chen
(74) *Attorney, Agent, or Firm*—Crowell & Moring LLP

(57) ABSTRACT

The invention relates to a metal substrate with a corrosion-proofing bond coating containing adhesion-conferring polymers, based on organic compounds, as well as a method for applying the bond coating. The metal substrate may be that of a vehicle body. The bond coating contains polybismaleimides as the adhesion-conferring polymers, which may be homopolymers or copolymers of bismaleimides and/or maleimide-terminated oligomers or polymers, which can be copolymers of these compounds and organic compounds with polymerizable functional groups. The bond coating is applied as a solution, emulsion, or dispersion, and fixed by heating or irradiation.

22 Claims, No Drawings

METAL SUBSTRATE FOR A VEHICLE BODY

This application claims the priority of German application 19715062.4, filed Apr. 11, 1997, the disclosure of which is expressly incorporated by reference herein.

BACKGROUND AND SUMMARY OF THE INVENTION

The invention relates to a metal substrate with a corrosion-proofing bond coating and a method for applying a corrosion-proofing bond coating. More specifically, this invention relates to a corrosion-proofing bond coating for a metal substrate of a vehicle body and a method for applying the same.

"Corrosion-proofing" coatings includes both those which slow down or mitigate corrosion as well as those which inhibit or prevent corrosion (i.e., corrosion-inhibiting coatings).

German patent 195 24 198 ("'198") and German patent application 196 50 478 ("'478"), filed Dec. 5, 1996, each disclose substrates with a corrosion-proofing coating. German patent '198 discloses painted sheet-metal parts with a corrosion-proofing bond coating ("coating"). The '198 coating is based on polybasic acids from homopolymers or copolymers of carboxylic acids or functional carboxylic acid esters containing double bonds. German patent '198 also discloses a method for applying this coating.

In addition, German patent application 196 50 478 ("'478") also discloses painted metal substrates with a corrosion-proofing bond coating. The '478 coating is based on homopolymers or copolymers of phosphonic acids or functional phosphonic acid residues containing double bonds. Both the '198 and '478 coatings provide qualitatively satisfactory corrosion protection compared to the traditional treatment where metal substrates were phosphatized and then electrophoretically dip-coated. Polybasic acids are more environmentally benign since they produce no toxic heavy metal salts or heavy metal oxides requiring separate disposal.

The disadvantage of these bond coatings is that polymers with high glass transition temperatures and/or low-molecular-weight acids have to be added to the polybasic acids to achieve sufficient wet bonding strength and hence satisfactory corrosion protection.

This is especially true for corrosion-proofing aluminum. To achieve good corrosion protection, aluminum is still frequently chromatized. The pretreatment solutions contain Cr (VI) compounds, which are toxic and carcinogenic. Thus, the resulting films contain toxic Cr compounds. Disposal of these substances is costly and involved. On the other hand, anodizing aluminum achieves good nontoxic corrosion protection but is expensive in terms of energy and processing costs.

One object of the present invention is to provide a metal substrate with a corrosion-proofing bond coating, and a method of application thereof, which simplifies pretreatment of metals and ensures good corrosion protection as well as good paint bonding when applied to the substrate. Other objects, advantages and novel features of the present invention will become apparent from the following description of the invention when below.

The present invention overcomes the above problems and disadvantages by providing a corrosion-proofing bond coating for metal substrates and a method for applying the same. The present invention discloses a new pretreatment concept and new pretreatment material. The quality of the corrosion protection for aluminum is sufficient to eliminate the need to chromatize aluminum. Furthermore, it is unnecessary to dope known polybasic acids with additional compounds.

Bond coating substrates according to the present invention may be used in composite construction. The bond coating may be applied to steel, aluminum, galvanized steel, or magnesium. The bond coating is resistant to moisture, solvents, and corrosive substances, and provides good protection against each. The bond coating is highly stable to heat and may be used over large areas. It provides good protection for engines, bodies, individual engine and body parts, subassemblies, and coils.

The bond coating of the present invention adheres well to the substrate and to subsequently applied paint films. Furthermore, it offers good moisture resistance and wet bonding strength, and hence good corrosion protection for subsequently applied paint films. It is sufficient to apply thin films with a thickness of 10 to 5000 nm. Because of savings in materials, the substrate and the method are particularly inexpensive in production.

The present invention is a metal substrate with a corrosion-proofing bond coating, comprising an adhesion-conferring polymer, based on organic compounds, comprising a polybismaleimide selected from the group consisting of: a bismaleimide homopolymer; a bismaleimide copolymer; a homopolymer of a maleimide-terminated oligomer; a copolymer of a maleimide-terminated oligomer; a homopolymer of a maleimide-terminated polymer; a copolymer of a maleimide-terminated polymer; copolymers thereof with an organic compound containing at least one polymerizable functional group; and mixtures of the preceding polybismaleimides.

The maleimide-terminated polymers of the invention are preferably phenolic resins, polyamides, polyether ketones, polyether sulfones, or polyesters. Polydiamides and polydianhydrides of polyfunctional organic acids are also appropriate.

Suitable bismaleimides are linear or cyclic, substituted or unsubstituted hydrocarbons with one to six carbon atoms, phenyl residues, biphenyl residues, triazoles, as well as diphenyl compounds. Examples are N,N'-ethylenebismaleimide, N,N'-hexamethylenebismaleimide, N,N'-(m-phenylene)bismaleimide, N,N.'-(p-phenylene) bismaleimide, N,N'-(4,4'-diphenylene)bismaleimide, N,N'-(4,4'-diphenyl ether)bismaleimide, N,N'-(4,4'-diphenyl ketone)bismaleimide, N,N'-(4,4'-diphenyl sulfone) bismaleimide, N,N'-(4,4'-dicyclohexylmethane) bismaleimide, N,N'-(4,4'-[1,1-diphenylpropane] bismaleimide), and N,N'-(3,5-[1,2,4-triazole]bismaleimide).

The organic compounds are preferably polyaerizable unsaturated compounds, in particular vinyl monomers, radically polymerizable unsaturated compounds and radically polymerizable unsaturated oligomers. Examples are styrene, substituted styrene, acrylonitrile, acrylic acid and its esters, methacrylic acid and its esters, acrylamide, glycidyl acrylate, glycidyl methacrylate, divinylbenzene, divinyltoluene, vinylphosphonic acid, vinylbenzoic acid, crotonic acid, cinnamic acid, sorbic acid, undecenoic acid, oleic acid, caffeic acid, vinylsilane compounds, vinyl ethers, etc. Examples of radically polymerizable unsaturated oligomers and polymers are unsaturated polyesters, polybutadiene, polypentadiene, etc. These compounds react when dried with homo- and copolymerization.

Compounds that also contain amino groups or thio groups, and react with bismaleimides in the Michael Condensation Reaction, are also suitable.

Also suitable are compounds that contain allylic double bonds and react with bismaleimides in an EN reaction. Examples are allylphenol or o,o'-diallylbisphenol A.

Cyanate compounds that react with bismaleimides with addition and cyclization as well as trimerization are also suitable. Isocyanate compounds and epoxides are also suitable. Examples of suitable epoxides are tetraglycidyldiaminodiphenylmethane, poly[(phenyl 2,3-epoxypropyl ether)-co-dicyclopentadiene], 4-vinylcyclohexene 1,2-epoxide as well as 4-vinylcyclohexene diepoxide.

In addition to these compounds, carboxylic or phosphonic acids are also suitable, including those that have only one functional group. Alkyl- or arylphosphonic acids or alkyl- or arylcarboxylic acids are preferred. Examples are ethylphosphonic acid or benzoic acid.

The method according to the invention is characterized by using the above-mentioned polybismaleimides as the adhesion-conferring polymers. These are applied as a film from an organic or aqueous solution or a dispersion or emulsion. Thus a thin organic film is applied to the metal substrate. After application this film is cured at elevated temperatures, preferably 80 to 200° C. If the organic film contains suitable molecules, curing by irradiation at room temperature is also possible. The film can be applied by any traditional application methods, particularly by spraying, dipping, rolling, spread-coating, etc. Electrophoretically assisted application methods can, also be used.

To apply the organic film, an organic or aqueous solution, an emulsion or dispersion containing bismaleimide, possibly with other organic compounds, is used. During the curing process these compounds and the bismaleimides react with homopolymerization or copolymerization. If necessary, suitable additives such as emulsifiers or dispersants can be added.

According to preferred embodiments, the organic or aqueous solution, dispersion, or emulsion is used in a concentration of 5 to 30 weight percent. In other preferred embodiments, the organic or aqueous solution of a dispersion or emulsion is used in a concentration of 0.05 to 3 weight percent.

The method of application may be performed in two steps. First, a thin organic film of the above-mentioned organic compounds with polymerizable functional groups is applied to the substrate. This film may be applied from an organic or aqueous solution or a dispersion or emulsion. After application, the coating is dried between 20° C. and 200° C. Second, a thin film of solution, emulsion, or dispersion containing bismaleimides is applied. These films are dried at temperatures between 50° C. and 250° C., allowing homopolymerization of the bismaleimides. The above-mentioned polymerization reaction may also take place between the first and second steps The first film of organic compounds adheres to the substrate due to the polymerization reaction. The second film adheres to the first film by the same mechanism.

A suitable polymerization catalyst may be added before application. Organic peroxides or ionic catalysts such as diazabicyclooctane are particularly suitable.

After application of the bond coating, a top coating may be immediately applied. It is not strictly necessary to apply a filler.

By employing the method of the present invention, many different substrates may be coated with a bond coating based on polybismaleimide, even in composite construction. For example, steel, aluminum, galvanized steel, or magnesium are suitable substrates. Because of the properties and stability of the bond coating, bodies, engines, body and engine parts, subassemblies, and coils may be coated as substrates. The method is simple and inexpensive and provides qualitatively high corrosion protection.

The invention will now be described in greater detail with the aid of example embodiments.

EXAMPLE 1

Application of unmodified bismaleimide coatings to steel substrates is described below.

A sheet steel body panel cleaned with ethyl acetate (material no. 1.0347) is coated using a spreader with a 20% solution of a mixture of bismaleimides (Technochemie: Compimide 976) in dioxane. The coated sheet metal is stabilized at 180° C. for 60 minutes in a circulating-air drying cabinet. A polyurethane acrylate top coat (Mercedes-Benz MB A00198648337/A0019868337) is then applied to the coated sheet metal with a spreader and cured for 20 minutes at 80° C. in a circulating air drying cabinet.

Bismaleimide coatings made in this way exhibit excellent wet bonding strengths to the substrate when kept in water for 1500 hours at 35° C. Coated sheet metal scratched for corrosion testing showed subsurface migration of 3–4 mm after four cycles in a VDA alternate [immersion] test.

EXAMPLE 2

Application of modified bismaleimide coatings on aluminum substrates is described below.

Sheet aluminum ($AlMg_{0.4}Si_{1.2}$) precleaned with ethyl acetate was cleaned by dipping for two minutes in a 20% aqueous cleaning solution (Henkel: Primalu), then rinsing with deionized water and dried for 30 minutes at 100° C. in a circulating air drying cabinet. The metal was then coated using a spreader with a 10% solution of nine parts of a bismaleimide mixture (Technochemie: Compimide 976) and one part 4-vinylcyclohexene 1,2-epoxide in dioxane and stabilized for 60 minutes at 200° C. in the circulating air drying cabinet. The pieces of metal were coated as in Example 1 with a polyurethane acrylate paint.

Metal coated in this way exhibits outstanding wet bonding strengths of over 1500 hours with 35° C. water storage. Coated sheet metal scratched for corrosion testing showed subsurface migration of 0.1 to 0.15 mm after 240 hours in the CASS test.

EXAMPLE 3

Application of modified bismaleimide coatings on steel substrates is described below.

A sheet steel body panel cleaned with ethyl acetate (material no. 1.0347) is applied as a film using a spreader with a 20% solution of eight parts of a mixture of bismaleimides (Technochemie: Compimide 796) and two parts 2-aminothiazole in dioxane. The coated sheet metal is stabilized at 200° C. for 60 minutes in a circulating-air drying cabinet. The coated metal was then provided with a polyurethane acrylate top coat as in Example 1.

Coated sheet metal scratched for corrosion testing showed a subsurface migration of 9–11 mm after eleven cycles in a VDA alternate [immersion] test.

EXAMPLE 4

Application of two-layer coatings is described below.

A steel sheet body panel cleaned with ethyl acetate (material no. 1.0347) was coated by dipping for one minute in a 0.01% solution of 4-vinylbenzoic acid in one part acetone and one part deionized water, then dried for 10 minutes at 120° C. in a circulating air drying cabinet. The metal treated in this way was then coated with a 20% solution of a bismaleimide mixture (Technochemie: Compimide 796) in dioxane using a spreader and stabilized for 60 minutes at 200° C. in the circulating air drying cabinet. The coated metal was then given a polyurethane acrylate top coat as in Example 1. Coated sheet metal scratched for corrosion testing showed subsurface migration of 6–7 mm after eleven cycles in a VDA alternate [immersion] test.

Although the invention has been described in detail, it is to be clearly understood that the same is by way of illustration and example, and is not to be taken by way of limitation. The spirit and scope of the present invention are to be limited only by the terms of the appended claims.

What is claimed is:

1. A method for corrosion-proofing a metal substrate, comprising:

applying a bond coating to the substrate, the bond coating consisting essentially of at least one organic adhesion-conferring polymer, said organic adhesion-conferring polymer consisting essentially of at least one polybismaleimide selected from the group consisting of: (i) a homopolymer comprising a bismaleimide, (ii) a homopolymer comprising a maleimide-terminated oligomer, (iii) a homopolymer comprising a maleimide-terminated polymer, (iv) a copolymer comprising a bismaleimide, (v) a copolymer comprising a maleimide-terminated oligomer, and (vi) a copolymer comprising a maleimide-terminated polymer wherein the coating is applied from an aqueous solution, an organic solvent solution, a dispersion or an emulsion; and subsequently stabilizing the bond coating on the substrate surface.

2. The product produced by the method of claim 1.

3. A method for corrosion-proofing a metal substrate, comprising:

(a) cleaning and de-greasing a substrate;

(b) applying a bond coating to the substrate, the bond coating consisting essentially of at least one organic adhesion-conferring polymer consists essentially of at least one polybismaleimide selected from the group consisting of: (i) a homopolymer comprising a bismaleimide, (ii) a homopolymer comprising a maleimide-terminated oligomer, (iii) a homopolymer comprising a maleimide-terminated polymer, (iv) a copolymer comprising a bismaleimide, (v) a copolymer comprising a maleimide-terminated oligomer, and (vi) a copolymer comprising a maleimide-terminated polymer;

wherein the coating is applied from an aqueous solution, an organic solvent solution, a dispersion or an emulsion;

(c) stabilizing the bond coating on the substrate surface by heat or irradiation; and (d) applying at least one paint coating on the substrate.

4. The method according to claim 3, wherein the bismaleimide has the formula:

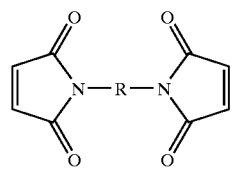

wherein R is a residue selected from the group consisting of:
(A) a linear, substituted $C_1$–$C_6$ hydrocarbon;
(B) a linear, unsubstituted $C_1$–$C_6$ hydrocarbon;
(C) a cyclic, substituted $C_3$–$C_6$ hydrocarbon;
(D) a cyclic, unsubstituted $C_3$–$C_6$ hydrocarbon;
(E) a phenylene residue;
(F) a biphenyl residue;
(G) a triazole;
(H) a compound with the formula:

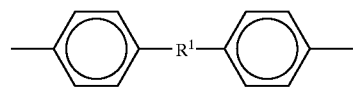

wherein $R^1$ is selected from the group consisting of $CH_2$—, —O—, —C(=O)—, —C(CF_3)_2—, —S—, —S—S—, —SO— and —SO_2—; and (I) a compound with the formula:

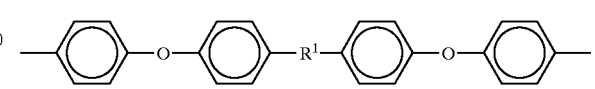

wherein $R^1$ is selected from the group consisting of $CH_2$—, —O—, —C(=O)—, —C(CF_3)_2—, —S—, —S—S—, —SO— and —SO_2—.

5. The method according to claim 3, wherein the bond coating is applied in a thickness of from 10 to 5,000 nm.

6. The method according to claim 3, wherein the organic solvent solution, aqueous solution, dispersion, and emulsion have concentrations of from 5 to 30 weight percent.

7. The method according to claim 3, wherein before applying the bond coating, at least one catalyst is added to the bond coating.

8. The method according to claim 7, wherein the at least one catalyst is selected from the group consisting of organic peroxides and ionic catalysts.

9. The method according to claim 3, wherein before applying the bond coating, at least one auxiliary agent is added to the bond coating.

10. The method according to claim 9, wherein the at least one auxiliary agent is selected from the group consisting of dispersants and emulsifiers.

11. The method according to claim 3, wherein the bond coating is stabilized by heat at a temperature from 50° C. to 250° C.

12. The method according to claim 3, wherein the bond coating is stabilized by heat at a temperature from 80° C. to 200° C.

13. The method according to claim 3, further comprising, before applying the bond coating, applying a thin organic film comprising at least one organic compound containing a polymerizable functional group, and stabilizing the thin organic film by heat.

14. The method according to claim 13, wherein the thin organic film is selected from the group consisting of an aqueous solution, organic solution, dispersion, and an emulsion.

15. The method according to claim 14, wherein the concentration of the solution is from 0.05 to 3 weight percent.

16. The method according to claim 13, wherein the organic film is stabilized by heat at temperatures from 20° C. to 200° C.

17. The method according to claim 13, wherein the organic film is stabilized by heat at temperatures from 70° C. to 140° C.

18. The method according to claim 13, further comprising applying a top coating to the substrate after step (c).

19. The method according to claim 3, wherein the substrate is selected from the group consisting of steel, aluminum, galvanized steel and magnesium.

20. The method according to claim 3, the substrate is selected from the group consisting of a vehicle body, an engine, a vehicle body component, an engine component, an assembly, and a coil.

21. The method according to claim 3, wherein the maleimide-terminated polymer is selected from the group consisting of:

(A) a phenol resin;
(B) a polyamide;
(C) a polyether ketone;
(D) a polyether sulfone;
(E) a polyester;
(F) a polydiamide of a polyfunctional acid, particularly with the formula:

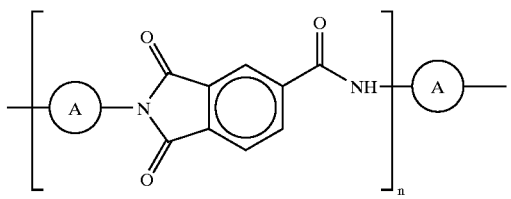

wherein A stands for diamine; and
(G) a polydianhydride of a polyfunctional acid, particularly with the formula:

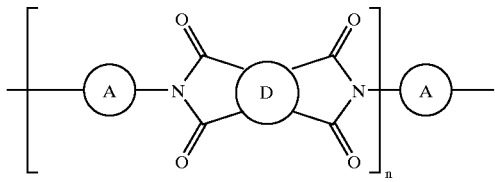

wherein A stands for diamine and D for dianhydnide.

22. A method for corrosion-proofing a metal substrate, comprising:

applying a bond coating to the substrate, the bond coating consisting essentially of at least one organic adhesion-conferring polymer, wherein the at least one adhesion-conferring polymer comprises at least one polybismaleimide selected from the group consisting of: (i) a homopolymer comprising a bismaleimide, (ii) a homopolymer comprising a maleimide-terminated oligomer, (iii) a homopolymer comprising a maleimide-terminated polymer, and (iv) a copolymer comprising a maleimide-terminated polymer;

wherein the maleimide-terminated polymer is selected from the group consisting of:

(A) a phenol resin;
(B) a polyamide;
(C) a polyether ketone;
(D) a polyether sulfone;
(E) a polyester;
(F) a polydiamide of a polyfunctional acid, with the formula:

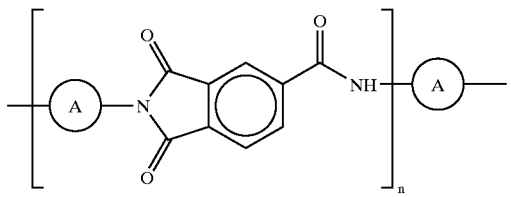

wherein A stands for diamine; and
(G) a polydianhydride of a polyfunctional acid, with the formula:

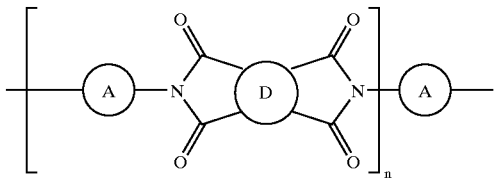

wherein A stands for diamine and D for dianhydride;
wherein the coating is applied from an aqueous solution, an organic solvent solution, a dispersion or an emulsion; and subsequently stabilizing the bond coating on the substrate surface.

* * * * *